United States Patent [19]

Cragin, Jr.

[11] Patent Number: 4,520,366

[45] Date of Patent: May 28, 1985

[54] METHOD AND APPARATUS FOR AIR START/STOP OF AN INK JET PRINTING DEVICE

[75] Inventor: Glynn P. Cragin, Jr., Irving, Tex.

[73] Assignee: The Mead Corporation, Dayton, Ohio

[21] Appl. No.: 569,138

[22] Filed: Jan. 9, 1984

[51] Int. Cl.³ .............................................. G01D 15/18

[52] U.S. Cl. .......................................... 346/1.1; 346/75

[58] Field of Search ........................... 346/75, 1.1, 140

[56] References Cited

U.S. PATENT DOCUMENTS

| | | | |
|---|---|---|---|
| 3,373,437 | 3/1968 | Sweet et al. | 346/75 |
| 3,570,275 | 3/1971 | Weber et al. | 68/205 |
| 3,596,275 | 7/1971 | Sweet | 346/75 X |
| 3,618,858 | 11/1971 | Culp | 239/15 |
| 3,709,432 | 1/1973 | Robertson | 239/4 |
| 3,777,307 | 12/1973 | Duffield | 346/75 |
| 3,836,913 | 9/1974 | Burnett | 346/75 |
| 3,854,399 | 12/1974 | Keur et al. | 101/426 |
| 3,942,342 | 3/1976 | Klein et al. | 68/205 |
| 4,019,352 | 4/1977 | McCollough, Jr. et al. | 68/205 |
| 4,031,561 | 6/1977 | Paranjpe | 346/75 X |
| 4,095,444 | 6/1978 | Pascoe, Sr. et al. | 68/205 |
| 4,190,844 | 2/1980 | Taylor | 346/75 |

*Primary Examiner*—Joseph W. Hartary
*Attorney, Agent, or Firm*—Biebel, French & Nauman

[57] ABSTRACT

A method and apparatus for starting and stopping the flow of ink from an ink jet printer having a plurality of ink jet orifices through which streams of droplets of ink continuously issue, charge electrodes, deflection electrodes and a drop catcher. An elongated nozzle extends along the length of the orifices and directs an air flow therefrom against the streams of ink issuing from the orifices so as to divert the stream into the catcher to prevent any ink droplets from falling on the media to be printed upon.

27 Claims, 3 Drawing Figures

METHOD AND APPARATUS FOR AIR START/STOP OF AN INK JET PRINTING DEVICE

BACKGROUND OF THE INVENTION

1. Field of the Invention

The present invention relates to ink jet printing apparatus, and more particularly, to method and apparatus for starting and stopping the flow of ink from a plurality of orifices onto a printing media.

2. Prior Art

At start-up and shut-down of ink jet printing devices a problem exists with how to keep the initial and terminal flow from the streams of ink issuing from the orifices from impacting on the media. At start-up and shut-down of the devices, the system is not immediately active and drops are not being charged and deflected to form the desired patterns until the system has reached a steady state with the flow of ink from all of the orifices being consistent.

Several devices have been developed which attempt to stop the flow of ink in the reservoir and thus prevent any ink from issuing from the orifices. However, this requires precise and expensive valving arrangements and shaping of the reservoir and orifice accordingly to prevent the dripping of ink after the valves have been shut off.

Still other apparatus have been developed which mechanically close off the orifices by passing a gate or other physical structure in front of the orifices to close them off. However, by passing the gate through the streams of ink issuing from the orifices, the leading edge of the gate causes a splattering of ink which is undesirable.

SUMMARY OF THE INVENTION

The present invention overcomes the abovedescribed difficulties and disadvantages associated with prior art devices by providing a simple and inexpensive means of diverting the streams of droplets issuing from the orifices of ink jet printers, at both start-up and shut-down, so that unwanted droplets will not fall upon the media being printed upon. To achieve this, at start-up of the ink jet printing device air is directed across the orifices transverse to the normal direction of issuance of droplets from the orifices, the deflection electrode voltage is turned on then the ink flow from the orifices is initiated, and finally the charge electrode voltage is turned on.

The air directed across the orifices pushes the initial drop formations into the catcher so that none of it falls on the media which is eventually intended to be printed upon. Once the issuance of droplets has stabilized and the charge and deflection electrodes are operational, the air flow is terminated and normal printing operations begin.

In order to stop the ink from striking the printing media at shut-down of the operation, the steps above are essentially reversed. First, the air flow is directed across the orifices so as to direct the ink issuing from the orifices into the catcher. The flow of ink from the orifices is then stopped, the charge and deflection electrodes are turned off and finally the air is turned off.

In one form of apparatus of the present invention the charge electrodes are movable between an operative position adjacent the orifices where a charge can be placed upon the droplets issuing from the orifices, and an inoperative position which is removed sufficiently from the position of the orifices that splatter or satellite drops will not light on the charge electrodes. When this construction is used, prior to the step of turning on the charge electrodes during start-up, the charge electrodes are moved from their inoperative position to their operative position, and vice-versa, when the system is being shut-down, prior to the step of stopping the flow of ink from the orifices the charge electrodes are moved from the operative to the inoperative position remote from the orifices.

Also, in a preferred form of apparatus of the present invention the deflection electrodes are formed with a porous surface which is supported by a housing forming a chamber behind the electrode. A vacuum is applied to the chamber to produce a suction through the face of the electrode that removes any ink from the satellite drops or misting which might occur during operation of the system. This is done to maintain the deflection electrodes dry so that they do not short out or have reduced efficiency. During the sequencing of operation at start-up, after the deflection electrode voltage is turned on, a vacuum is produced in the chamber. Likewise, in shutting down the system after the diverting air stream is turned off the vacuum in the chamber is turned off.

The location of the air distribution device which directs the air flow against the streams of droplets issuing from the orifices is preferably between the charge and deflection electrodes. This permits the air to be directed against the charge electrodes to keep them dry from ink mist or splattering.

DETAILED DESCRIPTION OF THE PREFERRED METHOD AND APPARATUS

Figure 3:
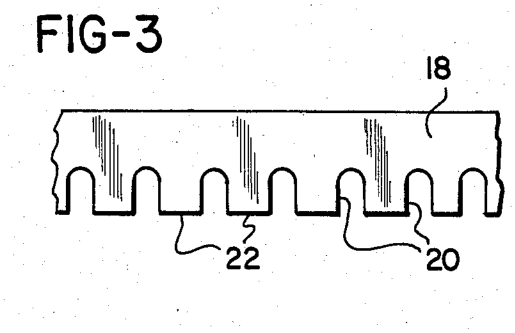
FIG. 3 is a partial view in the direction of line 3—3 in FIG. 2 illustrating the charge plate construction.

In the preferred embodiment illustrated in the accompanying drawings an ink reservoir 10 is kept filled with ink from an ink source 12 to continuously supply ink to a plurality of orifices 14, which in this case is illustrated as a single row, although multiple rows of orifices are commonly utilized and could be utilized with the present invention. The droplets issuing from the orifices 14 normally flow in an essentially straight line 16 and impact a media M, such as a running line of paper moving in the direction of the arrow of FIG. 1. Along this path 16 positioned immediately adjacent the orifices 14 is a charge plate 18 which supports in a well-known manner a plurality of charge electrodes which are coated upon or otherwise contained within the U-shaped slots 20 as shown in FIG. 3.

Figure 1:
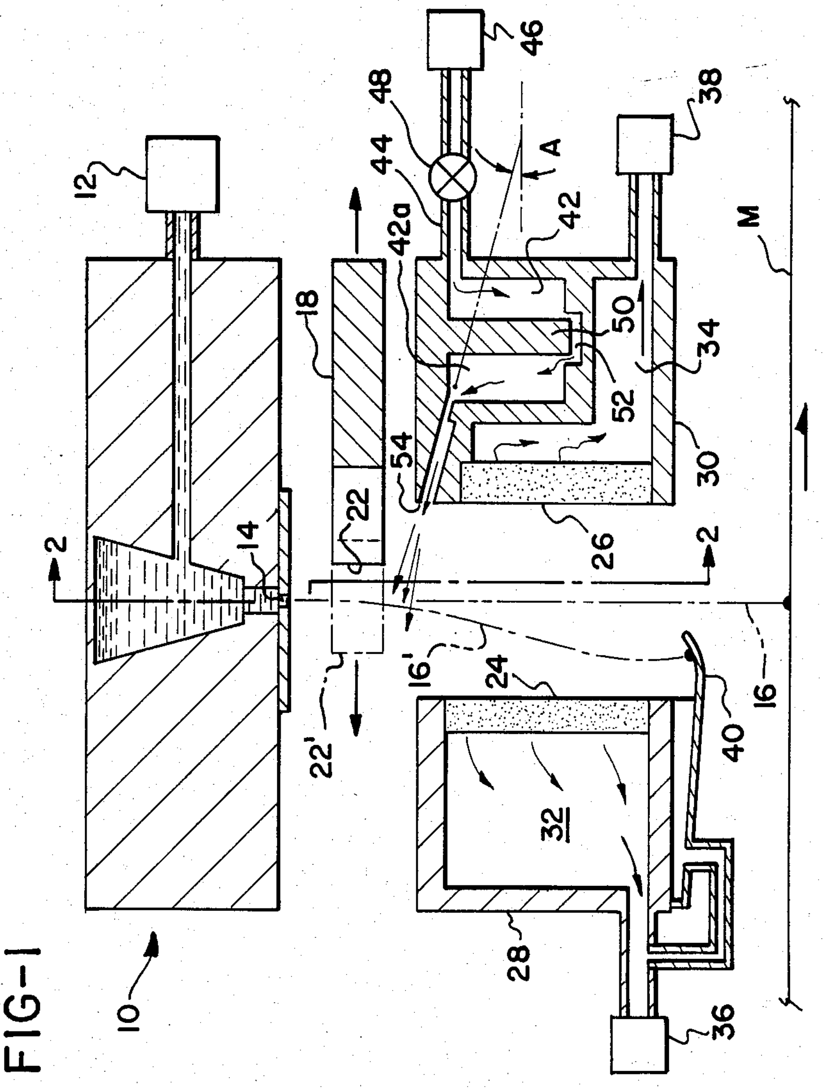
FIG. 1 is a schematic illustration in cross-section looking in the direction of the row of orifices from which the streams of ink drops issue.
Figure 2:
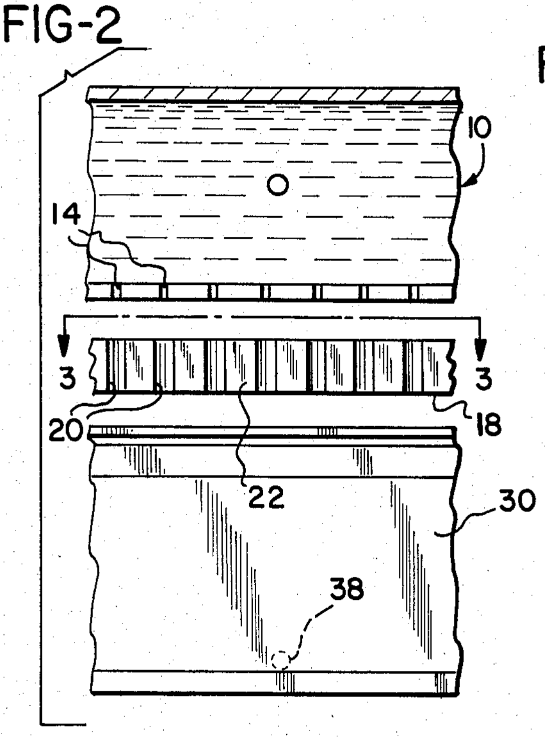
FIG. 2 is a schematic illustration of the embodiment of FIG. 1 looking at the streams of droplets of ink issuing from the orifices.

In the preferred embodiment shown, the charge plate 18 is movably supported so that the edge 22 of the charge plate can be moved laterally between an operative position, as shown in phantom in FIG. 1, and an inoperative position, as shown in solid line in FIG. 1. When the system is operational and the charge plate is in its operative position the streams of orifices pass through the U-shaped openings supporting the charge electrodes. When the system is shut-down and the charge plate is retracted to its remote position the rows of droplets move out of the U-shape openings in the charge plate so that the charge plate is moved out of the way for start-up and shut-down of the apparatus.

Beneath the charge plate 18 along the flow path 16 of the droplets are a pair of deflection electrodes 24 and 26 which are positioned closely adjacent the path of droplets and are used to change the path of the droplets in a well-known manner. In the preferred embodiment illustrated, these deflection electrodes 24 and 26 are porous and will permit ink to pass through their surfaces. Each of the electrodes 24, 26 are supported by respective housings 28 and 30 which form chambers 32, 34 behind the deflection electrodes. Hooked to each of these housings 28 and 30 in communication with the chambers 32 and 34 is a vacuum source such as pumps 36 and 38 which produce sufficient vacuum in the chambers to draw any ink through the deflection electrodes 24 and 26 so that these deflection electrodes are kept dry during operation. This is advantageous since, as is well-known with devices of this general nature, substantial misting occurs in the area of the row of droplets and this misting can cause shorting due to build-up on the electrodes.

Positioned beneath the deflection electrode 24 along the path 16 of the streams of droplets is a catcher 40. The catcher 40 extends along the rows of orifices and is used in a well-known manner to catch drops which have been diverted by the deflection electrodes in order to prevent them from dropping onto the media M which is being printed on. The catcher 40 is also attached to a vacuum source 36 for drawing off the ink as it accumulates in the catcher. In the present case the catcher 40 is also utilized during start-up and shut-down procedures to catch all the drops issuing from the orifices 14 in a manner described below.

The housing 30 which supports deflection electrode 26 also defines a further chamber 42 which is supplied with air through inlet 44 from an air source 46 through a valve 48. The chamber 42 is divided into two sections by baffle 50 which extends along the length of the chamber and is received at its lower end 52 in a corresponding recess formed in the housing 30 with a small opening or slot between the housing and end 52 so that a uniform and stabilized air flow is developed in the portion 42A of chamber 42.

The air is supplied through a tubular inlet 44 and needs to be distributed along the length of the row of orifices before it is ejected through the air flow distribution opening or nozzle 54 which likewise extends along the length of the row of orifices. In the preferred embodiment, the air flow distribution device 54 is essentially a slot extending along the upper edge of the housing 30 adjacent the rows of droplets of ink issuing from the orifices.

Although the angle A at which the air is expelled from the air flow distribution device 54 depends upon the geometry of the particular ink jet printing apparatus being utilized, it has been found that an angle of 10 degrees, with the preferred embodiment illustrated, is a sufficient angle to produce the desired results. Likewise, the volume of air expelled from the air distribution device 54 must be adjusted to achieve the proper trajectory 16' of the droplets so that they are captured by the catcher 40 during system start-up and shut-down.

In operation, when it is desired to start-up the ink jet printing device the valve 48 is first turned on to admit air into chamber 42 and expel it uniformly through the air flow distribution device 54. The vacuum pumps 36 and 38 are then turned on to produce suction behind the deflection electrodes 24 and 26. The deflection electrode voltage is then turned on, the flow of ink from orifices 14 is then initiated by supplying additional ink from the source 12 and subsequently the charge plate voltage is turned on. The charge plate is then moved from its inoperative position, where it was when the apparatus was shut-off, to its operative position so that the U-shaped openings 20 are disposed beneath their respective orifices 14. So long as the air is turned on the droplets, whether charged or not, will be deflected along the path 16' and will all be caught by the catcher 40. At the point in time that printing is desired to be initiated and the flow from the orifices is stabilized, the air is switched off by turning off valve 48 and the ink droplets will then respond as in normal ink jet printing operations and either impact the media M or the catcher 40 as desired.

Shut-down of the device is accomplished in essentially reversed order from the above-described starting procedure. Initially at shut-down the valve 48 is turned on so that air is emitted from the air distribution device 54 and changes the trajectory of all of the droplets from the path 16 to the path 16' so that they are all caught in catcher 40. The charge electrode voltage is turned off and the deflection electrode voltage is also turned off and the charge electrodes are retracted from their operative position to their inoperative position away from the streams of droplets. The ink is then turned off, then the air supply to the air distribution device 54 is turned off to stop the flow of air and finally the vacuum pumps 36 and 38 are turned off.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of starting and stopping the flow of ink from an ink jet printer on to a printing media from a plurality of ink jet orifices through which streams of droplets of ink continuously issue and having charge electrodes, deflection electrodes and a drop catcher, the steps comprising:

(a) starting up the flow of ink on to said media by
  (i) directing a flow of air across the orifices transverse to the normal direction of issuance of said droplets from said orifices,
  (ii) applying a deflection voltage to the deflection electrodes,
  (iii) initiating the flow of ink from said orifices,
  (iv) applying a charge voltage to the charge electrodes,
  (v) directing all of the issued droplets from said orifices into said catcher by use of said air flow,
  (vi) terminating said air flow to begin normal printing operation on said media;
(b) stopping the flow of ink on to said media by
  (i) directing a flow of air across the orifices transverse to the normal direction of issuance of droplets from said orifices so as to cause all of said droplets to be caught by said catcher,
  (ii) stopping the flow of ink from said orifices,
  (iii) turning the charge and deflection electrodes off, (iv) turning the air off.

2. The method of claim 1 wherein said charge electrodes are movable between an operative position adjacent to said orifices and an inoperative position remote from said orifices, including the steps of:

prior to the step (a) (iv) of applying a charge voltage to said charge electrodes, moving said charge electrodes from said inoperative position to said operative position, and prior to the step (b) (ii) of stopping the flow of ink from said orifices, moving said charge electrodes from said operative position to said inoperative position.

3. The method of claim 2 wherein said deflection electrodes have a porous surface adjacent the normal flow path of said droplets toward said media and a housing is provided supporting said deflection electrodes and defining a chamber therebehind, including the steps of:

prior to the step (a) (ii) of applying a deflection voltage to said deflection electrodes, producing a vacuum in said chamber sufficient to draw any ink into said chamber that might land on said deflection electrodes; and after the step (b) (iv) of turning the air off, turning the vacuum off.

4. A method as defined in claim 3 wherein said air flow is directed at an acute angle relative to a plane perpendicular to said normal path of droplets.

5. A method as in claim 4 wherein said angle is substantially 10 degrees.

6. The method of claim 2 wherein steps (a)(i) and (b)(i) include directing said air flow at said charge electrodes when they are in said operative position so as to keep said charge electrodes dry.

7. The method of claim 1 wherein said air flow originates from a position between said charge and deflection electrodes.

8. A method of regulating the flow of ink from an ink jet printer on to a printing media from a plurality of ink jet orifices through which streams of droplets of ink continuously issue and having charge electrodes, deflection electrodes and a drop catcher, the steps comprising:

starting up the flow of ink on to said media by (i) directing a flow of air across the orifices transverse to the normal direction of issuance of said droplets from said orifices, (ii) applying a deflection voltage to the deflection electrodes, (iii) initiating the flow of ink from said orifices, (iv) applying a charge voltage to the charge electrodes, (v) directing all of the issued droplets from said orifices into said catcher by use of said air flow, and (vi) terminating said air flow to begin normal printing operation on said media.

9. The method of claim 8 wherein said charge electrodes are movable between an operative position adjacent to said orifices and an inoperative position remote from said orifices, including the step of:

prior to the step (iv) of applying a charge voltage to said charge electrodes, moving said charge electrodes from said inoperative position to said operative position.

10. The method of claim 9 wherein said deflection electrodes have a porous surface adjacent the normal flow path of said droplets toward said media and a housing is provided supporting said deflection electrodes and defining a chamber therebehind, including the step of:

prior to the step (ii) of applying a deflection voltage to said deflection electrodes, producing a vacuum in said chamber sufficient to draw any ink into said chamber that might land on said deflection electrodes.

11. A method as defined in claim 10 wherein said air flow is directed at an acute angle relative to a plane perpendicular to said normal path of droplets.

12. A method as in claim 11 wherein said angle is substantially 10 degrees.

13. The method of claim 9 wherein step (i) includes directing said air flow at said charge electrodes when they are in said operative position so as to keep said charge electrodes dry.

14. The method of claim 8 wherein said air flow originates from a position between said charge and deflection electrodes.

15. A method of regulating the flow of ink from an ink jet printer on to a printing media from a plurality of ink jet orifices through which streams of droplets of ink continuously issue and having charge electrodes, deflection electrodes and a drop catcher, the steps comprising:

stopping the flow of ink on to said media by (i) directing a flow of air across the orifices transverse to the normal direction of issuance of droplets from said orifices so as to cause all of said droplets to be caught by said catcher, (ii) stopping the flow of ink from said orifices, (iii) turning the charge and deflection electrodes off, and (iv) turning the air off.

16. The method of claim 15 wherein said charge electrodes are movable between an operative position adjacent to said orifices and an inoperative position remote from said orifices, including the step of:

prior to the step (ii) of stopping the flow of ink from said orifices, moving said charge electrodes from said operative position to said inoperative position.

17. The method of claim 16 wherein said deflection electrodes have a porous surface adjacent the normal flow path of said droplets toward said media and a housing is provided supporting said deflection electrodes and defining a chamber therebehind, including the step of:

after the step (iv) of turning the air off, turning the vacuum off.

18. A method as defined in claim 17 wherein said air flow is directed at an acute angle relative to a plane perpendicular to said normal path of droplets.

19. A method as in claim 18 wherein said angle is substantially 10 degrees.

20. The method of claim 16 wherein step (i) includes directing said air flow at said charge electrodes when they are in said operative position so as to keep said charge electrodes dry.

21. The method of claim 15 wherein said air flow originates from a position between said charge and deflection electrodes.

22. In an ink jet printing apparatus having a plurality of ink jet orifices through which streams of droplets of ink can continuously flow for impacting a printing media, a charge device for electrically charging select ones of said droplets, an electrical deflecting device for diverting at least some of the charged drops, a drop catching device for catching said diverted charged drops, wherein the improvement comprises:

means producing an air flow transverse to the stream of droplets emitted from said ink jet orifices and between said charge device and said electrical deflection device for diverting all said droplets into said catcher, and means for turning said air flow off or on for starting or stopping, respectively, the impact of droplets on said media.

23. The improvement of claim 22 wherein said means for producing an air flow includes directing said air flow at an acuate angle relative to a plane perpendicular to the normal path of droplets coming from said orifices so as to impinge upon said charge device for drying it.

24. The improvement of claim 23 wherein said angle is substantially 10 degrees.

25. The improvement of claim 22 including said electrical deflection device having a porous deflection electrode, housing means supporting said deflection electrode and defining a first chamber therebehind, means causing a vacuum in said first chamber, said housing further defining a second chamber having an inlet and opening into said means for producing an air flow across the stream of droplets, said means for turning said air flow off and on being connected to said inlet of said second chamber for controlling the air flow thereto.

26. The improvement of claim 25 including air distribution means within said second chamber for distributing and stabilizing air flow prior to entering said air flow producing means.

27. The improvement of claim 22 wherein said means for directing air flow directs it against said charge device to keep it dry.

* * * * *